March 9, 1954  J. W. ALDRICH  2,671,271

MEASURING AND DISPENSING MECHANISM FOR TACKY TAPE

Filed Feb. 11, 1950  2 Sheets-Sheet 1

Inventor
John W. Aldrich
By Rockwell-Batchelor
Attorneys

March 9, 1954 J. W. ALDRICH 2,671,271
MEASURING AND DISPENSING MECHANISM FOR TACKY TAPE
Filed Feb. 11, 1950 2 Sheets-Sheet 2
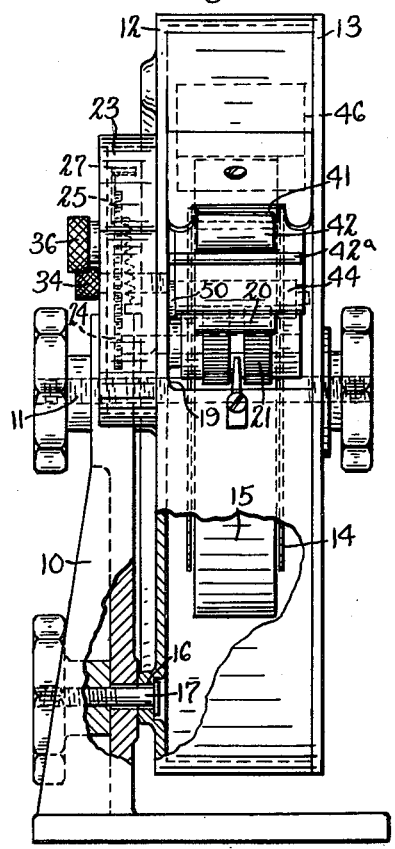
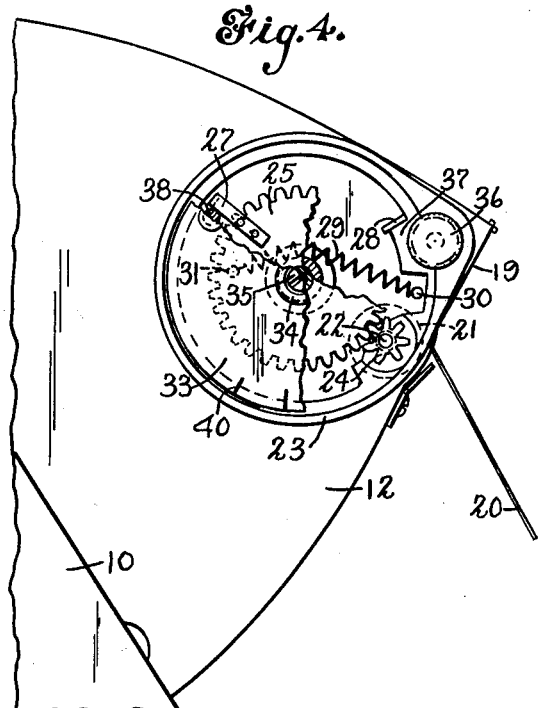
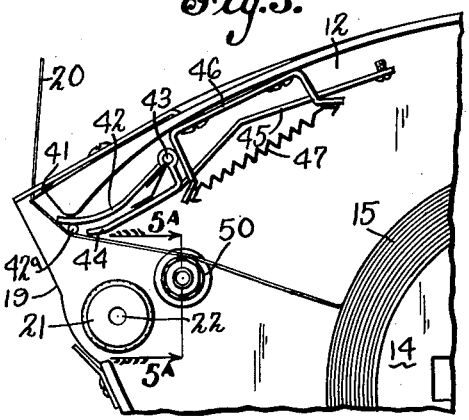
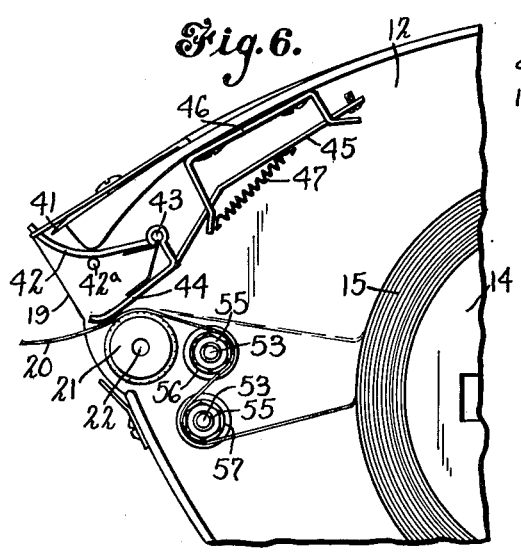
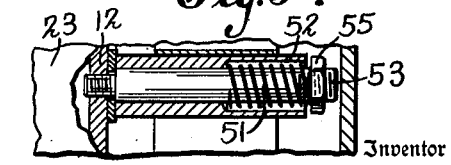
Inventor
John W. Aldrich
By Rockwell P. Bartholow
Attorneys Patented Mar. 9, 1954

2,671,271

UNITED STATES PATENT OFFICE 2,671,271

MEASURING AND DISPENSING MECHANISM FOR TACKY TAPE

John W. Aldrich, Woodbury, Conn., assignor to Derby Sealers, Incorporated, Derby, Conn., a corporation of Connecticut Application February 11, 1950, Serial No. 143,763

7 Claims. (Cl. 33—131)

This invention relates to tape-dispensing machines and, more particularly, to a device for dispensing tape which is adhesive or tacky upon one surface.

In devices of this type it is desirable to be able to dispense pieces of tape of measured length, and in the present instance this result is accomplished by drawing the tape from the supply roll with its tacky surface in contact with a measuring roll. The movement of the tape over the measuring roll effects rotation of the latter and, by adjustably limiting this rotation, the length of tape dispensed may be accurately measured.

Also in the present machine a severing blade is provided against which the tape is drawn to be severed and, when the tape is drawn over the severing blade, it is removed from contact with the measuring roll to permit the latter to be reversely rotated and return to its original position ready for a subsequent operation, this reverse rotation being effected by a spring provided for that purpose.

It has been found that in some instances an additional length of tape will be drawn from the supply roll when the tape is moved against the severing blade and, therefore, moved out of contact with the measuring roll. This is particularly true with a "low tack" tape where the tacky surface is such that it does not adhere strongly to the underneath layer on the supply roll. This drawing of an extra length of tape from the supply roll during the severing operation is due to the pull of the operator upon the tape during the severing operation, and to the resistance of the stripper member to movement toward the knife, this resistance requiring a stronger pull on the tape to move it against the knife. This will, of course, provide a longer length of tape than desired and interferes with accurate measuring of the dispensed length.

In the present instance this disadvantage is overcome by the provision of a brake roll so placed that its surface will be in contact with the tacky side of the tape between the supply roll and the measuring roll. Moreover, the parts are so disposed that the tacky surface of the tape will also be in engagement with the brake roll even when the tape is moved away from the measuring roll and moved against the severing blade. The engagement of the tape with the brake roll will provide an additional drag upon the tape resisting its being drawn from the supply roll so that the operator will not inadvertently draw an additional length from the supply roll when moving the tape against the severing blade.

Also, this brake roll is frictionally held against rotation by a spring adjustable as to its effective strength so that a drag will be placed upon this roll so that it will tend to remain in the position to which it is moved and, therefore, offer some resistance to the drawing of the tape thereover and prevent overrunning of the supply roll.

In some instances where an extremely "low tack" tape is employed, it is not convenient to place the brake roll in a position to give the tape sufficient contact therewith and, in such case, a guide or idler roller may be provided, as will be hereinafter described, to increase the wrap of the tape around the brake roll and, therefore, increase the area of contact of the tape with this roll so that there will be sufficiently resistance to the drawing of the tape from the supply roll so that this will not be done inadvertently.

It will be understood, however, that the present improvements are not limited to a dispensing device having a measuring roll, but may be applied to any tape dispenser in which the movement of the tape toward the severing means tends to draw the tape from the supply roll.

One object of the invention is to provide a new and improved device for dispensing tape which is tacky or adhesive upon at least one surface, the tape being dispensed in measured lengths.

A further object of the invention is to provide a tape-dispensing mechanism having means for measuring and severing the length of tape dispensed and also having means for preventing an additional length of tape being inadvertently drawn from the supply roll during the severing operations.

Still another object of the invention is to provide a tape-dispensing mechanism having a measuring roll which is adapted to be engaged by the tacky side of the tape, and a brake roll disposed between the measuring roll and the supply of tape, which brake roll is also in engagement with the tacky side of the tape to prevent overrunning of the supply roll or the inadvertent dispensing of a length longer than that desired.

A still further object of the invention is to provide a tape-dispensing machine having a measuring roll in contact with the tacky side of the tape, and a severing blade so disposed that the tape is disengaged from the measuring roll during the severing operation, which machine shall also be provided with a brake roll with which the tacky side of the tape remains in engagement after the tape is drawn away from the measuring roller.

To these and other ends the invention consists in the novel features and combinations of parts to be hereinafter described and claimed.

In the accompanying drawings:

Fig. 3 is a front elevational view of the device, some parts being shown in section;

Fig. 4 is a view similar to Fig. 2 with some parts being broken away and showing the measuring elements in a different position;

Fig. 5 is a fragmentary view similar to Fig. 1 showing the parts in another position;

Fig. 5a is a sectional view on line 5a—5a of Fig. 5; and

Fig. 6 is a view similar to Fig. 5 of a modified form of my invention.

Figure 1:
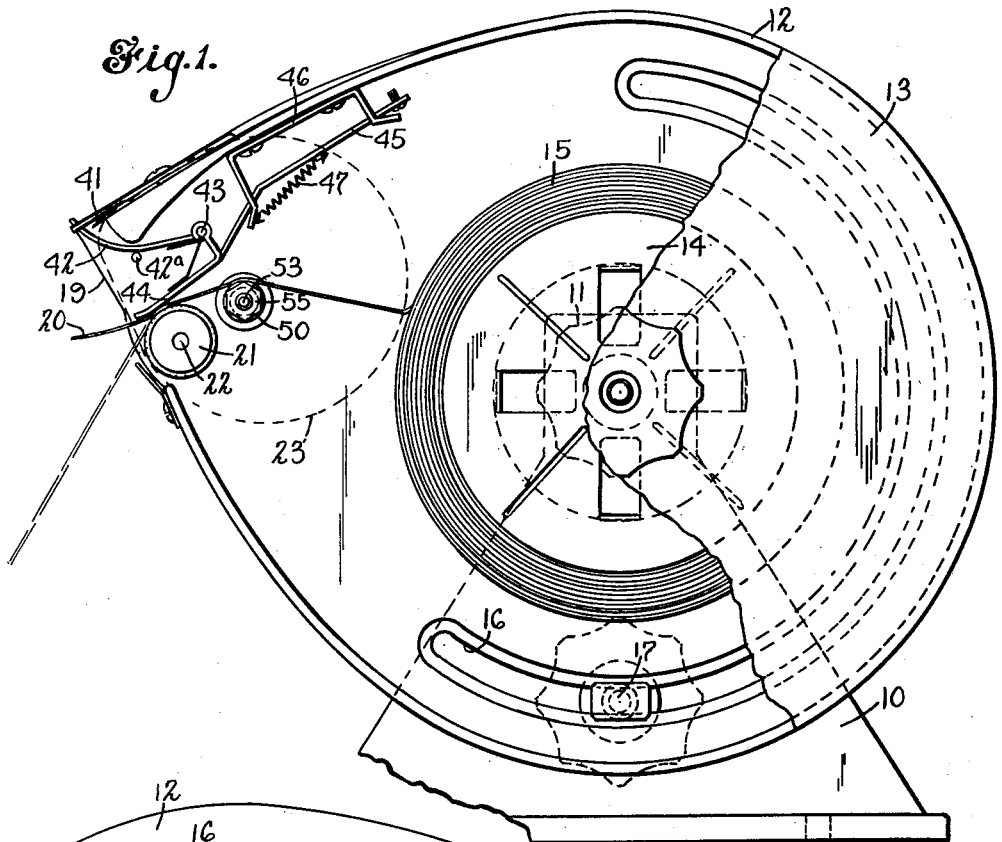
Fig. 1 is a side elevational view of a tape-dispensing mechanism embodying my invention, a portion of the housing being broken away to show the interior mechanism.

To illustrate a preferred embodiment of my invention, I have shown in Fig. 1 of the drawings a tape-dispensing mechanism comprising a standard 10 on which is rotatably mounted by the pin or screw 11 a casing or housing 12 having a removable cover 13. Rotatably mounted in the casing is a roll holder or reel 14 upon which the supply roll of tape 15 is mounted.

The casing may be provided with an arcuate opening 16 adapted to receive a screw clamp 17 mounted in the standard 10 so that the casing may be rotatably adjusted about the standard and secured in any adjusted position.

The casing 12 is provided with an opening 19 through which the free end 20 of the tape is drawn and adjacent this opening a measuring roller 21 is rotatably mounted in the casing, which roller is adapted to engage the tacky side of the tape.

The shaft 22 of the roller 21 extends through the wall of the housing or casing 12 into an auxiliary housing 23 and secured to the extended end of this shaft is a pinion 24, the teeth of which are in mesh with the teeth of a measuring gear 25 rotatably mounted in the auxiliary housing 23. The gear 25 is provided with an arm 27, which arm is normally held against a fixed stop 28 on the housing 23 by a spring 29, one end of which is secured at 30 to the housing and the other end of which is secured at 31 to the gear, so that this measuring gear normally stands in the dotted-line position shown in Fig. 2.

The auxiliary housing 23 is provided with a rotatably mounted cover 33 provided at its center with a knurled collar 34 by which it may be rotated and is attached to the housing by the screw 35 received within the collar 34. This cover is of disk-like form and its edge extends below the edge of a knurled screw 36 threaded into the housing so that it may be clamped in any desired adjusted position between the screw 36 and a shoulder 37 (Fig. 4) upon which the cover rests. The cover 33 is provided with an inwardly projecting stop 38 which projects into the housing 23 and stands in the path of the arm 27 so as to limit the rotation of the measuring gear 25 in a counter-clockwise direction as shown in Fig. 4.

Figure 2:
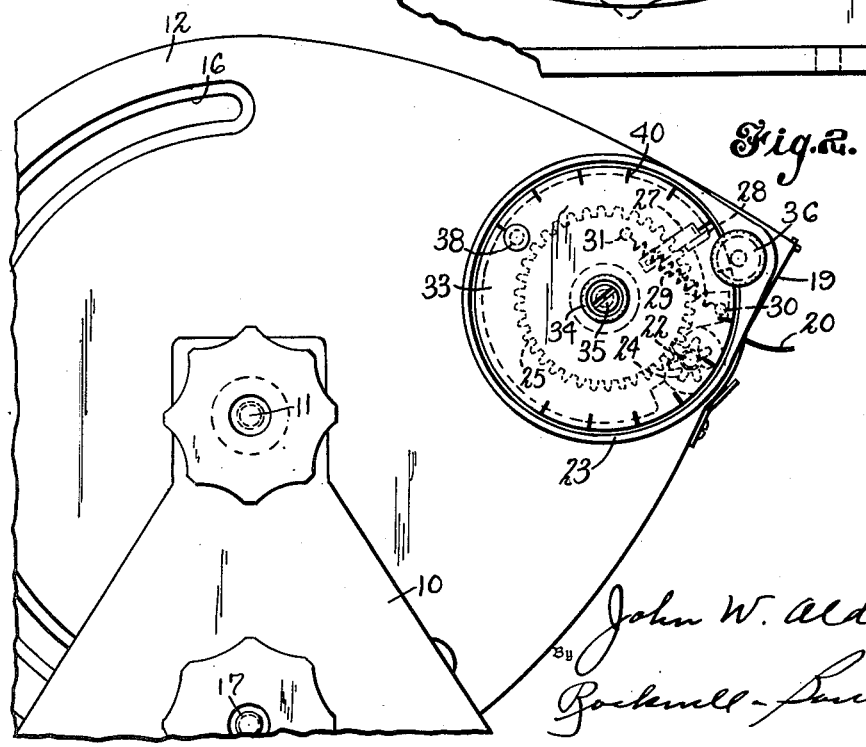
Fig. 2 is a side elevational view from the side opposite that shown in Fig. 1.

The cover 33 is also provided with indicia 40 upon its outer surface, which indicia cooperate with the nut 36 to indicate the length of tape being dispensed. As has already been explained, the abutment 28 limits the movement of the arm 27 and, therefore, of the measuring gear 25 in a clockwise direction, as shown in Fig. 2, which is the starting position of the parts. The plate 33 may be rotatably adjusted, when the screw 36 has been loosened, to any desired position to set the pin 38 at a point to limit the movement of the arm 27 in a counter-clockwise direction to the proper position to dispense the desired length of tape. It will, of course, be understood that as soon as the tacky side of the tape has been disengaged from the measuring roller 21 so that this roller is free to rotate in a reverse direction, the spring 29 will return the measuring gear 25 to its starting position and also return the roller 21 to its original position through the engagement of the pinion 24 with the gear 25.

A severing blade 41 is mounted on the casing 12 above the opening 19 against which the tape may be drawn to be severed, this blade being normally guarded by a guard member 42, the free edge of which stands forwardly of the cutting edge of the blade. The member 42 is pivoted at 43 to a stripper 44 and the front edge portion of this stripper bears against the non-tacky side of the tape and normally holds the tape against the measuring roller 21. The stripper member 44 is secured to or formed integrally with a guide plate 45 slidably mounted in a guide bracket 46 secured to the housing, and a spring 47, secured at one end to a leg of the bracket 46 and at its other end to the plate 45, normally maintains the stripper member in its forward position shown in Fig. 1. The guard 42 rests upon and is guided by a laterally extending pin 42a so that it is normally maintained in the position shown in Fig. 1.

In the operation of the machine as described above, the parts are normally in the position shown in full lines in Fig. 1. The operator may grasp the free end of the tape and draw it from the supply roll in contact with the roller 21, as shown in dotted lines in this figure. When the measured length has been drawn from the roll as determined by the engagement of the arm 27 with the adjustable stop 38 (Fig. 4), the operator may then draw the free end of the tape upwardly against the severing member 41, as shown in Fig. 5.

As will be seen from the latter figure, this draws the tape away from the measuring roller 21 and permits the parts of the measuring mechanism to be returned to their original positions by the spring 29. Also the contact of the upper side of the tape with the stripper 44 serves to move this stripper rearwardly as shown in Fig. 5 and, therefore, move the guard 42 rearwardly to expose the cutting edge of the severing blade for contact of the tape therewith. As soon as the severing operation has been effected, the spring 47 returns the stripper member 44 and the guard 42 to their original positions shown in Fig. 1 and, thus, returns the free end of the tape against the measuring roller leaving a projecting end to be grasped by the operator.

When the tape is moved away from the measuring roller and against the severing member, the drawing of an additional supply from the supply roll is resisted only by the adherence of one layer of tape to the next upon the supply roll and, therefore, any light pull upon the tape will dispense an additional quantity if a "low tack" tape is being used. To prevent this occurrence and to maintain accurate measuring of the dispensed lengths of tape, I have provided a brake roll 50 rotatably supported upon the casing or housing 12 so that it engages the tacky surface of the tape between the supply roll 15 and the measuring roller 21. This roller is so positioned that it will be in engagement with the tacky surface of the tape at all times even when the tape is drawn away from the measuring roll, as shown in Fig. 5. The engagement of the tape with this roller will tend to resist the drawing of additional tape from the supply roll and also tend to hold the tape in taut condition between the brake roller and the supply roll so as to tend to prevent any turning of the latter. This will, therefore, prevent any additional length of tape being drawn from the supply roll during the severing operation.

A drag or friction is placed upon the brake roll by means of a spring 51 set in a cup or counterbore 52 in the roller 50 and held in place by the screw 53 upon which this roller is rotatably mounted. The effective strength of the spring may be adjusted by the nut 55 on the screw 53 so that the desired friction may be placed upon this roll in order that it will tend to remain in the position to which it is turned, and, thus, keep the tape in taut condition between it and the supply roll.

A modified form of my invention is shown in Fig. 6. In dispensing an extremely "low tack" tape it sometimes occurs that the brake roll 50 may not be conveniently set in a position in which there will be a sufficient area of contact between the roll and the tacky side of the tape when the parts are in the position shown in Fig. 5. Also in dealing with a "high tack" tape it is sometimes desirable not to employ the brake roll 50, and it is, therefore, convenient to provide a dispensing mechanism in which this roll may or may not be employed, as desired.

In Fig. 6 of the drawings, I have shown a structure wherein the "wrap" about the brake roll may be increased so that there will always be a considerable area of contact of the tacky side of the tape with this roll and, in addition, the brake roll may not be employed if it is not considered necessary. As shown in this figure, a brake roll 56 is provided which is similar in all respects to the brake roll 50 except that it is mounted at a different position in the casing. It will be noted that the axis of the roll 50 is considerably above a line joining the centers of the supply roll 15 and the measuring roller 21, while the center of the roll 56 is substantially on, and the periphery, at its lower point, somewhat below, this line, as shown in Fig. 6.

As the tape 20 comes from the supply roll 15 it would normally be held out of engagement with the brake roll 56, as shown in dotted lines, so that if desired when a tape of "high tack" is being dispensed, the brake roll need not be employed and the device will be used as though no brake roll were provided. However, an idler roll 57 is provided below the roll 56 about which the tape may be trained to change the direction thereof and increase the wrap about the roll 56 so that there will be considerable area of tape in contact with the latter roll. It will be noted that the roll 57 engages the non-tacky side of the tape so that it will offer no resistance to the drawing of the tape from the supply roll, but merely change the direction thereof to increase the area of the tape in contact with the brake roll 56 and, therefore, prevent the tape from being inadvertently drawn from the supply roll during the measuring operation.

It will be understood that both rolls 56 and 57 may be provided with springs 51, as shown in connection with the roll 50 of Fig. 5ª, so that the desired friction or drag may be placed upon these rolls.

While I have shown and described a preferred embodiment of my invention, it will be understood that it is not to be limited to all of the details shown, but is capable of modification and variation within the spirit of the invention and within the scope of the claims.

What I claim is:

1. In a mechanism for dispensing tape which is tacky upon one surface, a suitably supported casing, means thereon for supporting a supply roll of tape, a measuring roller rotatably mounted in the casing in engagement with the tacky surface of the tape adjacent the free end thereof to be rotated by the tape as it comes from the supply roll, a severing member mounted in spaced relation to the surface of said roller on the opposite side of the tape and in such position relatively to the supply roll and said roller that said severing member and said roller define the limits of the path of the tape as it is drawn from the supply roll and must be moved away from the roller to be engaged with the severing member, and a brake roller rotatably mounted in the casing between said first roller and the supply roll and said brake roller being so located that its surface is engaged by the tape in its passage from the supply roll to the severing member as it is drawn over the latter.

2. In a mechanism for dispensing tape which is tacky upon one surface, a suitably supported casing, means thereon for supporting a supply roll of tape, a measuring roller rotatably mounted in the casing in engagement with the tacky surface of the tape adjacent the free end thereof to be rotated by the tape as it comes from the supply roll, a severing member mounted in spaced relation to the surface of said roller on the opposite side of the tape and in such position relatively to the supply roll and said roller that said severing member and said roller define the limits of the path of the tape as it is drawn from the supply roll and must be moved away from the roller to be engaged with the severing member, a brake roller rotatably mounted in the casing between said first roller and the supply roll, said brake roller being so located that its surface is engaged by the tape in its passage from the supply roll to the severing member as it is drawn over the latter, and a stripper member in engagement with the non-tacky side of the tape to strip the latter from the severing member and move it into engagement with the first-named roller.

3. In a mechanism for dispensing tape which is tacky upon one surface, a suitably supported casing, means thereon for supporting a supply roll of tape, a measuring roller rotatably mounted in the casing with which the tacky side of the tape is in engagement as it comes from the roll, measuring means connected to said roller, spring means urging said roller in a direction opposite to that of the movement of the tape, a severing member mounted in spaced relation to said roller and in such position relatively to the supply roll and to the measuring roller that the tape must be moved out of engagement with the measuring roller to be severed upon the severing member, and a brake roller mounted in the casing in position to engage the tacky side of the tape when the latter is moved from the measuring roller to the severing member.

4. A tape-dispensing mechanism according to claim 1 wherein means are provided to increase the wrap of the tape about said brake roller.

5. A tape-dispensing mechanism as in claim 1 wherein an idler roll is provided to engage the non-tacky side of the tape to direct the latter into engagement with said brake roller.

6. A tape-dispensing mechanism as in claim 2 wherein a guide roller is rotatably mounted in the casing in position to engage the non-tacky side of the tape and guide the latter into engagement with the brake roller.

7. A tape-dispensing mechanism as in claim 1 having a guide roller rotatably mounted in the casing in position to engage the non-tacky side of the tape and guide the latter into engagement with said brake roller, and also having means for frictionally retarding the rotation of the brake roller and the guide roller.

JOHN W. ALDRICH.

References Cited in the file of this patent

UNITED STATES PATENTS

| Number | Name | Date |
|---|---|---|
| 193,592 | Barker | July 31, 1877 |
| 1,244,708 | Crowell | Oct. 30, 1917 |
| 2,233,361 | Anderson et al. | Feb. 25, 1941 |
| 2,424,488 | Morin | July 22, 1947 |
| 2,447,145 | Van Cleef | Aug. 17, 1948 |
| 2,547,583 | Krueger | Apr. 3, 1951 |
| 2,553,658 | Larson | May 22, 1951 |